(12) United States Patent
Moore

(10) Patent No.: US 6,701,662 B1
(45) Date of Patent: Mar. 9, 2004

(54) DOUBLE WIRE SPINNER BAIT

(76) Inventor: Chester C. Moore, 517 Whites Mill Rd., Abingdon, VA (US) 24210

(*) Notice: Subject to any disclaimer, the term of this patent is extended or adjusted under 35 U.S.C. 154(b) by 0 days.

(21) Appl. No.: 10/157,634

(22) Filed: May 29, 2002

Related U.S. Application Data

(60) Provisional application No. 60/294,335, filed on May 30, 2001.

(51) Int. Cl.⁷ .............................................. A01K 85/10
(52) U.S. Cl. ................................... 43/42.13; 43/42.11
(58) Field of Search ..................... 43/42.11, 42.13, 43/42.14, 42.15, 42.16, 42.19

(56) References Cited

U.S. PATENT DOCUMENTS

| | | | |
|---|---|---|---|
| 1,836,650 A | * 12/1931 | Davenport | 43/42.19 |
| 3,143,824 A | * 8/1964 | Thomas | 43/42.11 |
| 3,293,790 A | * 12/1966 | Konomos | 43/42.15 |
| 3,504,454 A | * 4/1970 | Turbeville et al. | 43/42.11 |
| 3,996,688 A | * 12/1976 | Hardwicke, III | 43/42.11 |
| 4,011,681 A | * 3/1977 | Johnson | 43/42.11 |
| 4,012,862 A | * 3/1977 | Dubois | 43/42.11 |
| 4,037,345 A | * 7/1977 | Dubois | 43/42.13 |
| 4,044,491 A | 8/1977 | Potter | |
| 4,133,135 A | * 1/1979 | Miles | 43/42.13 |
| 4,536,986 A | 8/1985 | Stout | |
| 4,638,586 A | 1/1987 | Hall | |
| 4,742,639 A | 5/1988 | Gunn | |
| 4,823,500 A | * 4/1989 | Shindeldecker | 43/42.13 |
| 4,827,660 A | 5/1989 | Dudeck | |
| 5,058,309 A | * 10/1991 | Firmin | 43/42.13 |
| 5,092,073 A | 3/1992 | Kaecker | |
| 5,201,784 A | 4/1993 | McWilliams | |
| 5,499,470 A | 3/1996 | Reed | |
| 5,517,782 A | 5/1996 | Link et al. | |
| 5,551,185 A | 9/1996 | Reed | |
| 5,605,004 A | 2/1997 | Boullt et al. | |
| 5,647,163 A | 7/1997 | Gorney | |
| 5,718,076 A | 2/1998 | Wallrath | |
| 5,953,848 A | 9/1999 | Darnell et al. | |
| 5,974,723 A | 11/1999 | Taibi | |
| 6,018,901 A | 2/2000 | DuBois | |
| 6,041,538 A | 3/2000 | Roemer | |
| 6,266,914 B1 | 7/2001 | Johnson et al. | |

FOREIGN PATENT DOCUMENTS

| | | | | |
|---|---|---|---|---|
| CA | 711437 B1 | * | 6/1965 | 43/42.16 |
| JP | 8-103193 B1 | * | 4/1996 | |
| JP | 2002-65116 B1 | * | 3/2002 | |
| JP | 2002-191258 B1 | * | 7/2002 | |

* cited by examiner

*Primary Examiner*—Darren W. Ark
(74) *Attorney, Agent, or Firm*—McGuireWoods LLP

(57) ABSTRACT

Disclosed is a double wire spinning bait lure. The lure preferably comprises a multi-piece construction, in particular, a hook, a molded lead head, two stainless steel wires connected to form a frame, and two spinning blades. The design of the lure is able to retain its original form and functionality after repeated use and provides a spinning effect that is capable of maintaining produces greater vibrations, thus, making the lure more attractive to fish and increasing the odds for catching more fish.

20 Claims, 4 Drawing Sheets

DOUBLE WIRE SPINNER BAIT

PRIORITY CLAIM

This application claims the benefit of U.S. Provisional Patent Application No. 60/294,335, filed May 30, 2001, under 35 U.S.C. §119(e), the disclosure of which is hereby incorporated by reference.

DESCRIPTION

BACKGROUND OF THE INVENTION

1. Field of the Invention

This invention pertains generally to fishing lures, and, more particularly, to double wire spinning bait.

2. Background Description

Sport fishing, and especially bass fishing, in recent times has experienced a large degree of popularity. Competitive sporting events such as fishing tournaments with large monetary and other prizes awarded have grown from minor events to large events with an ever-increasing number of participants and prizes. Generally, prizes are awarded on the basis of the weight and number of fish caught in a given time. Consequently, a fishing lure that can expedite the quantity of the catch is of great significance to the angler.

Fishing lures of various designs and constructions are available on the market, including those known as spinner bait. Spinner bait is generally know n as a fishing lure that combines a weighted body having a hook and a spinner support wire attached thereto, one or more spinner blades connected to the wire, and a means in the wire, such as an eyelet, for attaching a fishing line. As the lure is pulled through the water by the fishing line the spinner blades rotate randomly so as to be attractive to fish. Additional fish-attracting members such as a plastic worm or the like, or a plastic or rubber skirt, are further utilized to conceal the hook and to provide additional fish-attracting vibrations to the lure. However, the main attraction of fish to a spinner bait lure is due to the vibration and flashing of the spinner blades themselves.

Conventional spinner bait lures were originally constructed as an attempt to provide increased vibration and flutter to the blades. For example, the wire extending from the lure's weighted body—that functions to carry the spinner blades—usually has a first diameter wire extending from the weighted body to the fishing line attachment location, and a second, but smaller, diameter wire extending from the line attachment location to the spinner blade. This provides increased vibration to the lure. Examples of such conventional spinner bait lures are disclosed in U.S. Pat. No. 6,266,914 to Johnson, et al. (issued Jul. 31, 2001); U.S. Pat. No. 6,041,538 to Roemer (issued Mar. 28, 2000); U.S. Pat. No. 6,018,901 (issued Feb. 1, 2001); and U.S. Pat. No. 5,201,784 to McWilliams (issued Apr. 13, 1993). However, such designs suffer from numerous drawbacks including an inability of the lure to retain its original form due to the flexibility of the wire.

Such conventional techniques have resulted in numerous attempts to improve the vibration and flutter characteristics of spinner bait lures so as to attract a fish. Prior art systems for spinner baits generally utilize a V-shaped rigid wire form having one end attached to a weighted body that carries a hook, and the other end attached to the spinner blades that rotate about the fishing line. Attempts have also been made to provide an artificial spinner bait fishing lure having a flexible cable for carrying the spinners, the flexible cable and one end of a substantially V-shaped rigid wire form being supported by a hook carrying means, and another end of the wire form being mounted about the flexible cable and slidable relatively thereto.

Conventional spinner bait fishing lures have a hook carrying, weighted body member to which the end of a first leg of a substantially V-shaped rigid wire form and one end of a flexible cable are connected, the cable passing through an eyelet or the like at the end of a second leg of the wire form and carrying spinner blade means at its end remote from the body member, the wire form having an eye at the junction of the legs for connection to a fishing line. When a force is applied by the fishing line to the bait, the flexible cable bends and the second leg slides along the cable.

Despite the various types of spinner baits available on the market today, there remain several problems that have not been heretofore addressed. Spinner baits currently available on the market today are single wire spinner baits, that is, only a single wire is used to connect the hook to the spinning blades. The single wire design poses many difficulties to a fisherman. After catching a fish or making contact with an underwater obstacle, a single wire spinner bait will consistently lose its form. In other words, because of the inherent flexibility of the single wire constructions, the single wire arm that holds the spinning blades will no longer lie in the same plane with the head/hook side of the lure. As a result the single wire spinning bait will experience a loss of vibration and an irregular motion underwater. This will deter fish from striking because the motion of the bait is inconsistent, thus defeating its intended purpose. To attempt to remedy this problem the fisherman must attempt to manually bend the single wire holding the spinning blades back into its original form by hand or by use of a tool. Other single wire spinner baits on the market try to overcome this problem by using high-strength materials such as titanium. Nevertheless, over time such designs still require manual adjustment of the wire to maintain its intended form.

Another shortfall of the single wire design is the tendency of the fishing line to lose its initial position with respect to the lure. As a single wire spinner bait is cast repeatedly, the fishing line can easily slide down the single wire arm that holds the spinning blades. If this occurs, the fishing line can become entangled in the spinning blades, potentially fraying or severing the line and resulting in the loss of the lure. Single wire spinning baits also have no precautions to prevent the spinning blades themselves from traveling into the line/lure connection point. Once this occurs, damage to the blades or the line can also result in the loss of the lure.

Therefore, there is an existing need for a double wire spinner bait. Moreover, there is an existing need for a double wire spinner bait configured such that the lure includes a bend that can provide a spring effect that allows more vibrations to transmit into the fishing lure thus providing a unique feel of the spinning blades while being retrieved.

There is also an existing need for a double wire spinner bait that is composed of a corrosion resistant material that is not readily susceptible to vibrational fatigue.

SUMMARY OF THE INVENTION

The present invention seeks to cover an area of fishing lures that has not been addressed. A solution to the problems outlined above is proposed using a double wired spinning bait that will maintain its original form and remain functional after repeated use, and will produce greater vibration thus increasing the odds for catching more fish. In the absence of this fishing lure, line damage and loss of the lure could easily occur.

An object, in accordance with an exemplary embodiment of the present invention, is to provide a spinning bait that will maintain its original form and remain functional after repeated use.

Another object of the present invention is to provide a spinning bait capable of producing strong vibrations thereby increasing the odds of catching more fish.

It is yet another objective of the present invention to provide a spinner bait configured such that the lure includes a bend that can provide a spring effect to allow more vibrations to transmit into the fishing lure, thus providing a unique feel of the spinning blades while being retrieved.

In the furtherance of this and other objectives, a preferred embodiment of the present invention includes a lure with an "R" bend that acts as a spring between the weighted side and the spinner blade side of the lure. This spring effect allows more vibrations to transmit into the fishing lure thus providing a unique feel of the spinning blades while being retrieved. Accordingly, the fishing lure of the invention provides a unique vibrational feel that is beneficial to a person using the lure.

Still another objective of the present invention is to provide a double wire spinner bait that is composed of a corrosion resistant material that is not readily susceptible to vibrational fatigue. In the furtherance of this and other objectives, a preferred embodiment of the present invention is comprised of stainless steel.

It is yet another objective of a preferred embodiment, in accordance with the present invention, to provide a lure where the "R" bend includes an eye portion, a hook leg, a spinner leg, and a connecting leg. The hook leg is a wire extending between the eye portion and the bulbous hook portion. The spinner leg is the wire extending between the eye and the spinners. Further, the connecting leg connects the ends of the hook leg and the spinner leg, respectively.

Further objects, features and advantages of the invention will become apparent from the following detailed description taken in conjunction with the accompanying drawings.

DETAILED DESCRIPTION OF PREFERRED EMBODIMENT OF THE INVENTION

Those involved in recreational, commercial and professional fishing endeavors are continually searching for more effective fishing lures. In particular, fishermen prefer to use fishing lures that not only make attractive targets for fish but that are reliable, durable and cost-efficient. The double wire spinner bait of the present invention satisfies these requirements, and it provides a fishing lure with a natural feel that will improve the odds of catching more fish. Moreover, the present invention disclosed herein provides unique solutions to the problems associated with conventional fishing lures such as the single wire spinning bait design.

In view of the present disclosure, one of ordinary skill in the art will appreciate that, while the fishing bait of the present invention is quite functional, it is also relatively simple to construct and is highly reliable since it requires minimal maintenance to retain its usefulness. Moreover, though a preferred embodiment of the present invention is discussed with respect to specific materials, dimensions and orientations herein, the actual construction of this apparatus and the selection of materials greatly depends upon manufacturer specifications and what durable, non-corrosive materials are available. To that end, however, a preferred embodiment of the present invention would be constructed of a stainless steel material that provides inherent strength and resists the onset of corrosion and rust so as to improve the vibration fatigue life of the bait.

Figure 1:
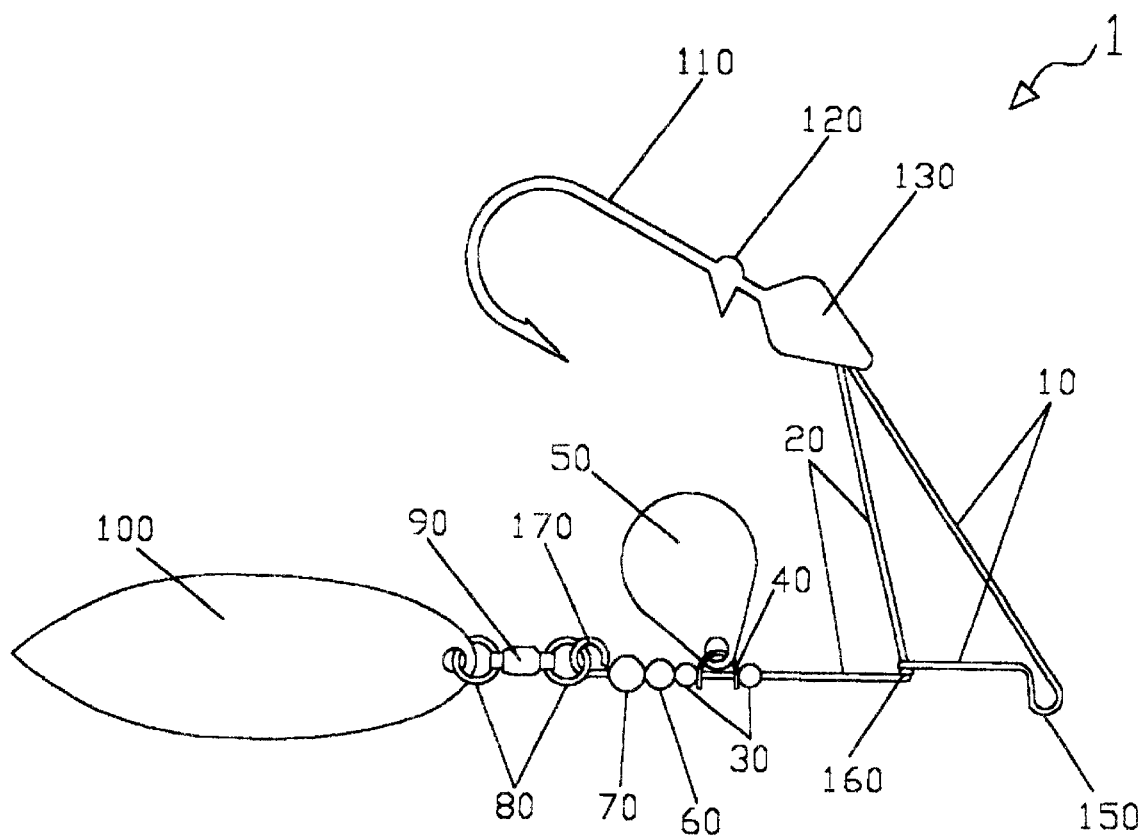
FIG. 1. Shows a diagrammatic view of the double wire spinning bait in accordance with an embodiment of the present invention.
Figure 2:
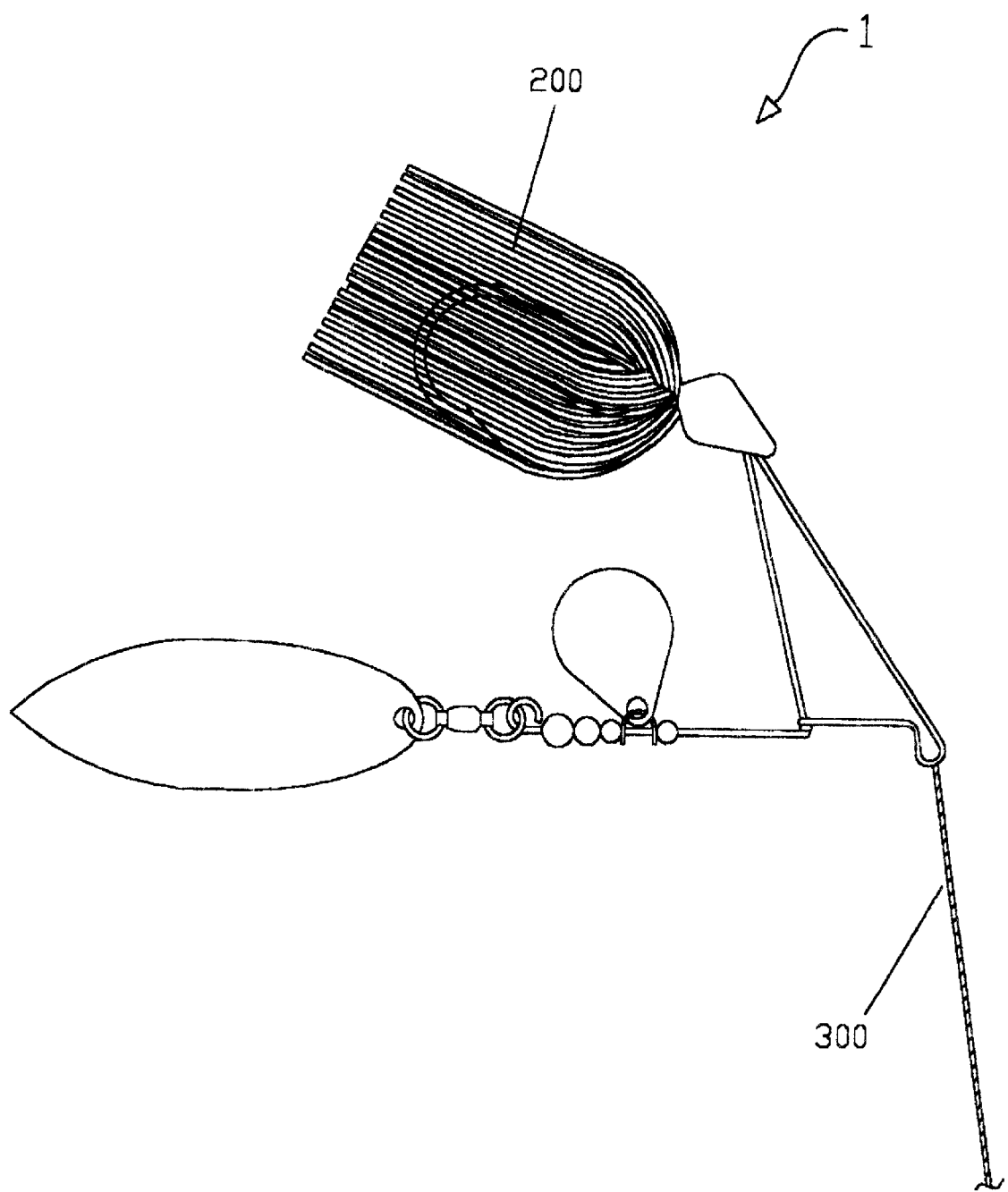
FIG. 2. Shows a diagrammatic view of the double wire spinning bait with attached rubber skirt and fishing line in accordance with an embodiment of the present invention.

A preferred embodiment of the present invention will now be described in detail with reference to the drawings contained in FIGS. 1–4. As shown in FIG. 1, the double wire spinner bait 1 includes a weighted body "head" portion 130 that makes the lure submersible during the fishing operation. Preferably this head is constructed of lead, or some other dense material that can easily be formed in a mold to connect the other components (as discussed below). Another component of the present invention is the hook 110, preferably constructed of a 5/0 stainless steel material, and having an eye portion 140 (see FIG. 3) that is secured to the head 130 by securing means. Preferably, the head 130 is formed by pouring molten lead into a mold so that the securing means is provided as the lead hardens to form the head 130 (as discussed below). In a preferred embodiment, two wire members 10 and 20 are included to provide the "double wired" function of the present invention. Though the wire members 10 and 20 act in tandem while the fishing lure is in use, each is independently tied, or otherwise attached using attaching means to the eye portion 140 of the hook 110. Preferably, the attachment means comprises looping the ends of the wires 10 and 20 through the eye portion 140 of the head 110. Preferably, the wire members 10 and 20 are constructed of a stainless steel material; however, other materials that can resist corrosion and rust can also be used.

Figure 3:
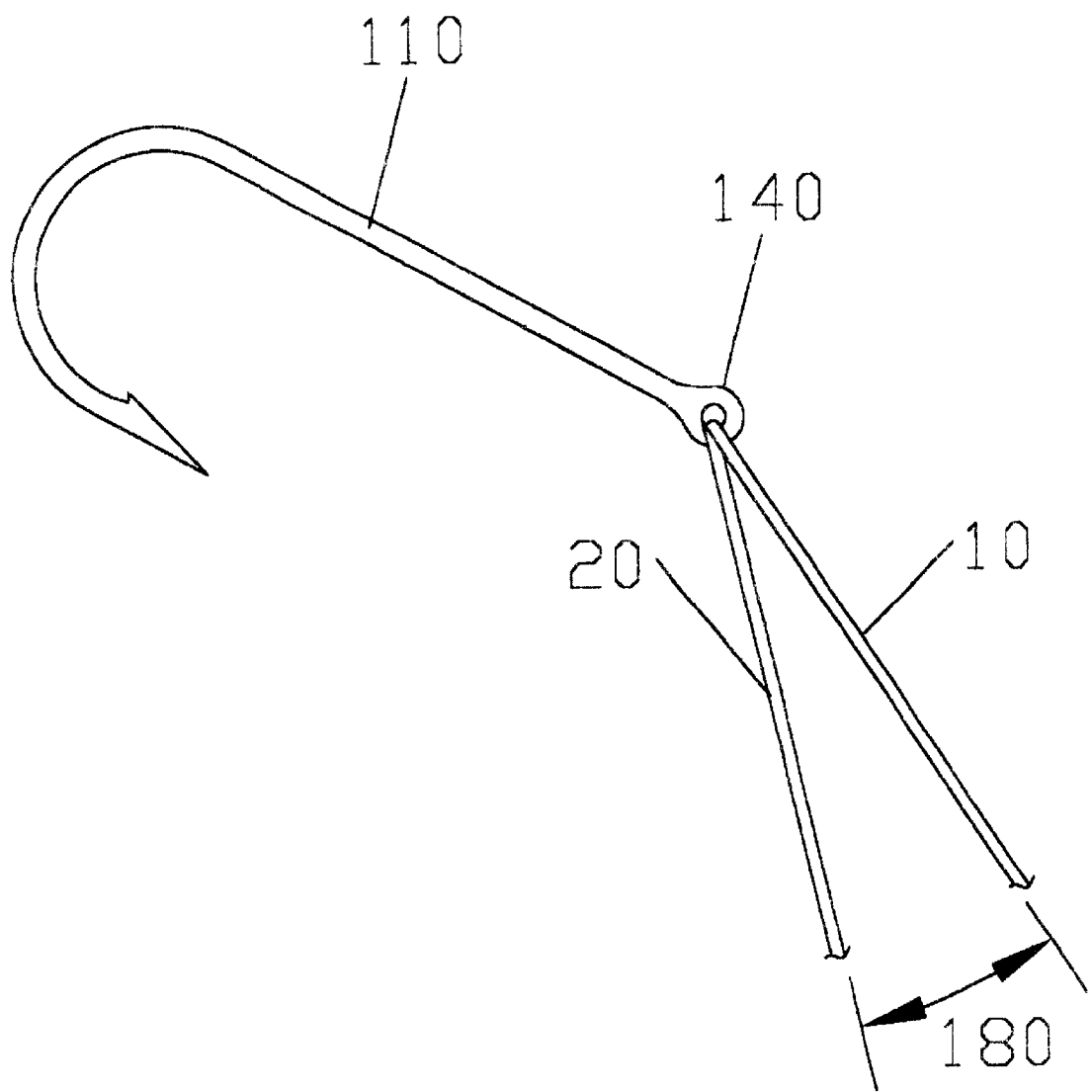
FIG. 3. Depicts attachment of the hook and spinner wires of the double wire spinner bait to an eye portion of a hook in accordance with an embodiment of the present invention.

To form a preferred embodiment of the present invention, the eye portion 140 of the hook 110, including the wires 10 and 20 connected thereto, are placed into a mold. With reference to FIG. 3, an angle 180 between the two wires 10 and 20, with reference to a common locus 140, is in the range of 15–30 degrees, preferably 22 degrees; however, other angles can be used to provide more or less stiffening effect (as discussed below). Lead, or another dense material of choice, is then poured into the mold, and, upon hardening, forms the head 130 that acts as the weighted portion of the lure. This head 130 also provides connectivity between the eye portion 140 of the hook 110 and the ends of each of the wires 10 and 20 that are fastened thereto (see FIG. 3). The head 130 formed via the mold can also provide an area 120 for tying a rubber skirt 200 (shown in FIG. 2), or some other means for concealing the presence of the hook portion 110 of the bait. Area 120 also provides a means for maintaining the position of the skirt 200 with respect to the hook 110. Additional components of the double wired spinner bait 1, in a preferred embodiment of the present invention, include two spinning blades 50 and 100 that attach to at least one of the wires 10 and 20 by connection means as discussed below.

For purposes of explaining the attachment of the spinning blades, the two wires 10 and 20, which extend outward from the eye portion 140 of the hook 110 (see FIG. 3), will be referred to as the hook wire 10 and the spinner wire 20, respectively. The hook wire 10 has a first end connected to the eye portion 140 of the hook 110, it extends therefrom and is formed into an "R" bend at the location 150, and it is tied or otherwise attached using attaching means to the spinner wire 20 at a bend in the spinner wire 20 at the location 160. Preferably, the resulting length of the hook wire 10, from its first end inside the head 130 to the "R" bend at the location 150, should be approximately the length of the hook 110 so as to prevent the spinning blade 100 from interfering with the tip of the hook 110. The "R" bend serves to hold the fishing line to the lure since the "R" shape provides an eyelet at or near the location 150 convenient to tie the fishing 300 line (see FIG. 2). Also, the "R" bend acts as a spring between the head 130 and the spinner wire 20. This spring effect provides significantly improved stiffness to the lure, especially as compared to the conventional single wire spinner bait, so that the overall form of the lure is retained during the fishing maneuver. The stiffness of the spring effect can be varied by, among other things, increasing or decreasing the angle 180 between the hook wire 10 and the spinner wire 20. Further, this configuration provides a natural vibrational feel throughout the entire double wired spinner bait 1 that is beneficial to a person using the lure.

The spinner wire 20 also has a first end connected to the eye portion 140 of the hook 110, and, after being formed in the mold, it extends from the head 130 so as to form an angle 180 with respect to the hook wire 10 (see FIG. 3). The spinner wire 20 is formed with a bend at the location 160 where the second end of the hook wire 10 is fastened to the spinner wire 20, such that the terminal end of the spinner wire 20 (i.e., the portion that attaches to the spinning blades) is inclined slightly with respect to horizontal and is oriented towards the hook 110. That is, with reference to FIG. 4, the angle 190 of the bend of the spinner wire 20 with respect to the location 160 is in the range of 70–85, preferably 80 degrees.

Figure 4:
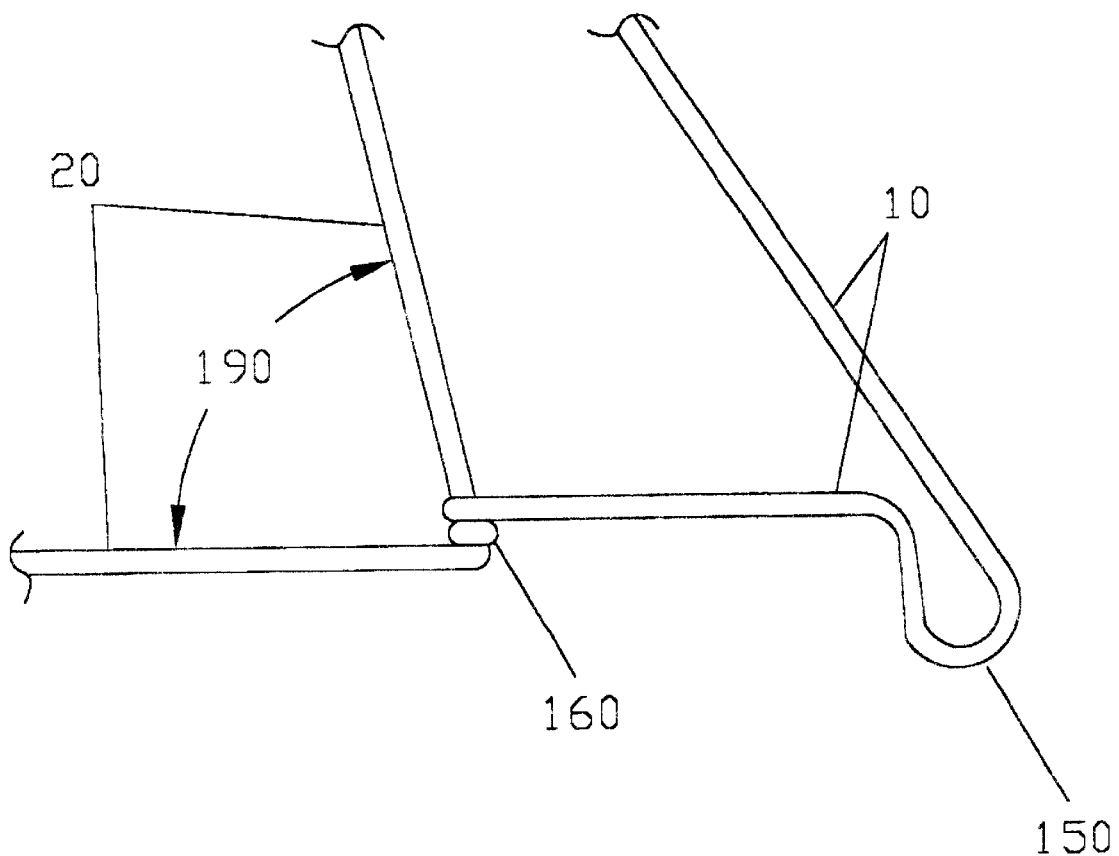
FIG. 4. Depicts an enlarged view of attachment and configuration of the hook wire and the spinner wire in accordance with an embodiment of the present invention.

In the preferred embodiment of the present invention, with reference to FIGS. 1, 3 and 4, the two wires 10 and 20 extend divergently from the head 110, forming an angle 180 between the wires, and are connected together to form a frame for providing stiffness to the lure. The connection between the two wires 10 and 20 is preferably provided by the terminal portion of the hook wire 10, that is the portion of the hook wire 10 that follows the "R" bend at the location 150. Attachment means used in the preferred embodiment to connect the terminal portion of the hook wire 10 include wrapping the second end of the hook wire 10 around the bend in the spinner wire 20 at the location 160.

Referring again to FIG. 1, the spinner blade wire 20 supports attachment of two spinning blades 50 and 100 before ending as a final loop 170. Means for rotatable attachment of the first spinning blade 50, in a preferred embodiment of the present invention, includes a first bead 30, followed by the spinning blade 50 that is captured inside a clevis 40, and additional beads 30, 60 and 70. Each of the beads 30, 60 and 70 and the clevis 40 are preferably allowed to slide along the length of the spinner wire 20 between the final loop 170 and the location at 160, at which the bend in the spinner wire 20 occurs. The final loop 170 of the spinner blade wire 20 preferably holds a first snap ring 80 that attaches to a swivel 90, and connects to the second spinning blade 100 by a second snap ring 80.

The manner by which the hook wire 10 and the spinner wire 20 are attached to the hook 110 before the lead is poured into the mold to form the head 130 also separates the lure of the present invention from others available on the market today. The two wires 10 and 20 are independently looped through the eye 140 of the hook 110 (see FIG. 3). This process is unique because the wires 10 and 20 are then independent of the structural integrity of the head 130. That is, even if the head 130 is damaged, the hook 110 cannot fall off because of the redundancy provided by the double wire design (i.e., the wires 10 and 20). In addition, this configuration of the wires 10 and 20 provides a spring effect between the hook 110 and the spinning blades 50 and 100 that allows a better feel since the fisherman can sense the blade 100 as it turns in the water during use. Also, the blade 100 does not become tangled on the line because it is separated from the line by the length of the wires 10 and 20. Consequently, the vibration generated from the turning of the blade 100 is very beneficial to the person using the lure.

Another unique characteristic of the double wired spinner bait 1 is its stainless steel composition in the preferred embodiment disclosed herein. Stainless steel provides additional advantages over many single wired spinning baits on the market today that are composed of mild carbon steel. The use of stainless steel as the wire and hook material provides greater strength than mild carbon spring steel. This improved strength allows for longer use and resilience of the lure since the wires are less likely to bend. The use of stainless steel also inhibits the onset of rust or corrosion. Other material choices are possible and within the scope of this disclosure, to include titanium, titanium-alloys or other similar materials.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes, which come within the meaning and range of equivalency of the claims, are to be embraced within their scope.

What is claimed is:

1. A double wire spinner bait fishing lure apparatus that retains its original form and functionality after repeated uses, comprising:

a hook that includes an eye portion at a first end;

at least two wire members, including a spinner wire having a bend and a hook wire, including means to attach first ends of said wire members to said eye portion of said hook;

a head, of sufficient weight and density so that the lure is submersible during a fishing maneuver, including means to secure therein said first ends of said wire members and said eye portion of said hook;

at least one fish attracting element rotatably mounted to a second end of said spinner wire;

an eyelet for attaching a fishing line formed from a segment of said hook wire; and a connector leg extending between said eyelet and said bend of said spinner wire and being immovably attached to said spinner wire at the bend by connecting a free end of said connector leg to said bend of said spinner wire, wherein said wire members extend divergently from said securing means of said head and are arranged to form a substantially triangular closed frame structure with said wire members remaining fixed with respect to one another to provide stiffness to said lure.

2. The apparatus of claim 1, wherein said head is comprised of a lead weight formed by pouring molten lead into a mold, in which hardening of the lead provides said means to secure therein said first ends of said wire members and said eye portion of said hook.

3. The apparatus of claim 2, wherein said means to attach said first ends of said wire members to said eye portion of said hook comprises looping said first ends of said wire members into said eye portion.

4. The apparatus of claim 3, wherein said head further comprises an area for attaching a means for concealing said hook.

5. The apparatus of claim 4, wherein said means for concealing said hook comprises a rubber skirt.

6. The apparatus of claim 2, wherein said hook and said wire members are formed of stainless steel.

7. The apparatus of claim 1, wherein said at least one fish-attracting element comprises a spinning blade.

8. The apparatus of claim 7, wherein there are two spinning blades.

9. The apparatus of claim 1, wherein said eyelet comprises an "R" bend connection, and further comprising:
   a segment of said spinner wire extending from said bend and terminating in said second end of said spinner wire for attachment of said at least one fish attracting element;
   wherein said connector leg is immovably attached to said bend in said spinner wire by attachment means.

10. The apparatus of claim 9, wherein said connector leg attachment means comprises wrapping a second end of said hook wire around said bend to form a joint therein.

11. The apparatus of claim 9, wherein a relationship between a portion of said spinner wire extending from said head and said segment of said spinner wire extending from said bend is defined by an angle in the range of 70–85 degrees.

12. The apparatus of claim 11, wherein said angle is 80 degrees.

13. The apparatus of claim 1, wherein an angle formed between said spinner wire and said hook wire, measured with respect to a common locus at said eye portion of said hook, is in the range of 15–30 degrees.

14. The apparatus of claim 13, wherein said angle is 22 degrees.

15. A double wire spinner bait fishing lure apparatus that retains its original form and functionality after repeated uses, comprising:
   a hook that includes an eye portion at a first end;
   a spinner wire and a hook wire attached to said eye portion of said hook by looping first ends of said wires thereto;
   a head, formed by pouring molten lead into a mold, in which hardening of the lead secures said first ends of said wires to said eye portion of said hook;
   two spinning blades rotatably mounted to a second end of said spinner wire;
   wherein said wire members extend divergently from said head to form an angle measured with respect to a common locus at said eye portion of said hook, and are arranged to form a substantially triangular closed frame structure with said wire members remaining fixed with respect to one another for providing stiffness to said lure, said frame configured into an "R" bend connection, comprising:
   an eyelet for attaching a fishing line, formed from a segment of said hook wire; and
   a connector leg extending between said eyelet and a bend formed in said spinner wire, a segment of said spinner wire extending from said bend so as to form an angle with respect to a portion of said spinner wire extending from said head and terminating in said second end of said spinner wire for rotatable mounting of a fish attracting element;
   wherein said connector leg is immovably attached to said bend in said spinner wire by wrapping said second end of said hook wire around said bend to form a joint therein, and a relationship between said spinner wire extending from said head and said segment of said spinner wire extending from said bend is defined by an angle in the range of 70–85 degrees.

16. The apparatus of claim 15, wherein said hook and said wire members are formed of stainless steel.

17. The apparatus of claim 15, wherein said head further comprises an area for attaching a means for concealing said hook.

18. The apparatus of claim 15, wherein said angle between said portion of said spinner wire extending from said head and said segment of said spinner wire extending from said bend is approximately 80°.

19. The apparatus of claim 15, wherein said second end of said spinner wire includes a rotatable mounting comprising:
   a clevis attached to a first spinning blade of said two spinning blades, said clevis allowed to rotate around and slide along a length of said spinner wire between a first bead located between said bend in said spinner wire and said clevis and a second bead located between said clevis and said second end of said spinner wire;
   a first snap ring attached to said second end of said spinner wire;
   a swivel having a first end attached to said first snap ring; and
   a second snap ring attached to a second end of said swivel and further attached to a second spinning blade of said two spinning blades.

20. The apparatus of claim 19, further comprising third and fourth beads located between said second bead and said second end of said spinner wire.

* * * * *